(12) United States Patent
Arnold et al.

(10) Patent No.: US 10,744,465 B2
(45) Date of Patent: Aug. 18, 2020

(54) FILTRATION UNIT

(71) Applicant: Tangent Company LLC, Chagrin Falls, OH (US)

(72) Inventors: Adam Arnold, Aurora, OH (US); Travis Genshock, Chagrin Falls, OH (US); John Merrin, Lisbon, OH (US); Brendan Matheny, Solon, OH (US); Paul Wadham, Avon Lake, OH (US)

(73) Assignee: TANGENT COMPANY LLC, Chagrin Falls, OH (US)

( * ) Notice: Subject to any disclaimer, the term of this patent is extended or adjusted under 35 U.S.C. 154(b) by 126 days.

(21) Appl. No.: 16/156,403

(22) Filed: Oct. 10, 2018

(65) Prior Publication Data

US 2019/0105610 A1  Apr. 11, 2019

Related U.S. Application Data

(60) Provisional application No. 62/570,385, filed on Oct. 10, 2017.

(51) Int. Cl.
*B01D 65/02* (2006.01)
*B01D 69/06* (2006.01)
*C02F 1/44* (2006.01)
*B01D 63/08* (2006.01)

(52) U.S. Cl.
CPC ........... *B01D 65/02* (2013.01); *B01D 63/082* (2013.01); *B01D 69/06* (2013.01); *C02F 1/44* (2013.01); *B01D 2313/04* (2013.01); *B01D 2313/14* (2013.01); *B01D 2313/26* (2013.01); *B01D 2313/90* (2013.01); *B01D 2321/185* (2013.01); *C02F 2303/16* (2013.01)

(58) Field of Classification Search
CPC ........ B01D 63/08–088; B01D 2315/06; B01D 2313/04; B01D 2313/14; B01D 2313/26; B01D 2313/90; B01D 53/85; B01D 53/78; B01D 2321/185; B01D 65/02; B01D 69/06; C02F 1/44; C02F 2303/06
See application file for complete search history.

(56) References Cited

U.S. PATENT DOCUMENTS

| | | |
|---|---|---|
| 7,014,173 B2 | 3/2006 | Rabie et al. |
| 7,288,197 B2 | 10/2007 | Shao et al. |
| 8,308,939 B2 | 11/2012 | Livingston |
| 8,372,282 B2 | 2/2013 | Zha et al. |
| 8,506,806 B2 | 8/2013 | Beck et al. |
| 8,741,141 B2 | 6/2014 | Masutani et al. |

(Continued)

OTHER PUBLICATIONS

The International Search Report and Written Opinion issued in the corresponding International Patent Application No. PCT/US2018/055204; dated Jun. 4, 2019.

*Primary Examiner* — Pranav N Patel
(74) *Attorney, Agent, or Firm* — Pearne & Gordon LLP

(57) ABSTRACT

A filtration unit for purifying or treating fluid that includes one or more membrane units having a permeate section. The permeate section of the membrane units is fed fluid that passes through a sealing insert having a fluid inlet and a passage that discharges in fluid communication with the permeate section. The sealing insert is arranged in a support frame of the membrane unit to form a fluid channel for delivering fluid through the insert and along an outer perimeter surface that maintains performance of the membrane unit during operation.

23 Claims, 10 Drawing Sheets

(56) References Cited

U.S. PATENT DOCUMENTS

| | | |
|---|---|---|
| 9,433,903 B2 | 9/2016 | Cumin et al. |
| 9,636,635 B2 | 5/2017 | Benton et al. |
| 2003/0111402 A1 | 6/2003 | Baig et al. |
| 2005/0123727 A1* | 6/2005 | Hester .................. B01D 63/082 428/188 |
| 2010/0051546 A1 | 3/2010 | Vuong et al. |
| 2010/0213124 A1 | 8/2010 | Takabatake et al. |
| 2011/0005994 A1 | 1/2011 | Masutani et al. |
| 2011/0011787 A1 | 1/2011 | Masutani et al. |
| 2011/0192794 A1 | 8/2011 | Chidambaran et al. |
| 2011/0272335 A1 | 11/2011 | Cote |
| 2012/0067809 A1* | 3/2012 | Nakagawa ............. B01D 29/39 210/346 |
| 2013/0221546 A1 | 8/2013 | Christ et al. |
| 2013/0299412 A1 | 11/2013 | Masutani et al. |
| 2015/0344337 A1 | 12/2015 | Ando et al. |
| 2015/0353396 A1 | 12/2015 | Takabatake et al. |
| 2016/0115057 A1 | 4/2016 | Tanaka et al. |
| 2016/0339391 A1 | 11/2016 | Hansen et al. |
| 2017/0081216 A1 | 3/2017 | Kelada |
| 2017/0087518 A1 | 3/2017 | Volmering et al. |

\* cited by examiner

FILTRATION UNIT

This application claims benefit of priority of U.S. Provisional Patent Application Ser. No. 62/570,385, filed Oct. 10, 2017, which is incorporated herein by reference in its entirety.

FIELD

The invention relates to a filtration unit for treating fluids such as wastewater, and in particular, a filtration unit having a membrane unit with a permeate section in fluid communication with a sealing insert and aeration guide system that facilitates fluid flow, permeate liquid or scouring gas, into the permeate section of the membrane unit for improved performance.

BACKGROUND

Filtration units are used to filter a liquid, such as water, by typically submerging the filtration unit in the liquid. Vacuum is often used to force or pull liquid through membranes in the filtration unit to produce a filtered permeate. In order for the filtration unit to operate efficiently, the components need to be adequately sealed. Some existing filtration units include components that are permanently connected, for example glued or welded, to seal the components, which creates a single-piece component or filtration unit. In the event that one of the components fails or is damaged, the entire sealed unit often needs replaced at a significant cost. Therefore, there is an unmet need for an affordable sealed filtration unit that contains separate components that can be individually replaced as needed to control cost.

Additionally, filtration units can collect debris or scale during operation. To combat fouling, the filtration units can include a scouring component, such as an air scour, to reduce or prevent membranes from fouling and becoming blocked. Some existing air scour systems fail to evenly scour all the membrane surfaces or require additional components in order to do so. Scour systems also can dislodge debris that can collect in permeate feed conduits and clog or reduce flow to the filtration unit. Such flow disruptions can result in undesirable pressure drop and performance in the filter. Therefore, there is also an unmet need for an adequate air scour unit that evenly scours all membranes surfaces in a filtration unit that can ensure continuous flow to the permeate section.

SUMMARY

Described herein is a filtration unit having at least one membrane unit made of two membrane sheets affixed to a support plate to form a permeate section therebetween. Spacer blocks connect the membrane units together. The membrane units and the spacer blocks have openings (e.g., holes) that when assembled are aligned to create various pseudo-conduits, such as a permeate conduit and an air bleed conduit. The permeate conduit is connected to the permeate section such that permeate can flow from the permeate sections of the membrane units to the permeate conduit. The air bleed conduit is also connected to the permeate section such that gas that accumulates in the permeate sections can be discharged or bled off through the air bleed conduit. The membrane units have sealing inserts with openings, for example center holes, that are arranged and secured in the support plates and align with the holes of the spacer blocks to form a portion of the permeate and air bleed conduits. The spacer blocks can have additional openings that create an aeration conduit and have guides or channels for guiding a gas from the aeration conduit to various points along the width of the membrane sheets for scouring the sheets, for example, along multiple locations at or adjacent to the top and/or bottom portions of the sheets.

In a first aspect, there is disclosed a filtration unit that includes a membrane unit having a permeate inlet for introducing fluid into a permeate section of the membrane unit; and a sealing insert having a fluid inlet, a passage with a passage fluid outlet and a perimeter surface with a fluid channel, the passage outlet of the sealing insert and the fluid channel of the perimeter surface of the sealing insert being in fluid communication with the permeate inlet of the membrane unit. Fluid communication, as used herein, includes the presence of a flow path for fluid to flow from or through one component or section of the filtration unit to another component or section of the filtration unit.

In an example of aspect 1, the fluid inlet of the sealing insert is a central opening of a ring structure and the passage is arranged internal in the ring structure. For example, the passage can extend radially from a surface defining a portion of the center opening of the ring structure to an outer perimeter surface of the ring structure.

In another example of aspect 1, the perimeter surface of the sealing insert includes the passage fluid outlet of the passage.

In another example of aspect 1, the sealing insert includes a plurality of passages each having a passage inlet open to the fluid inlet of the sealing insert and a passage outlet in fluid communication with the permeate inlet of the membrane unit.

In another example of aspect 1, the fluid inlet of the sealing insert is connected to a permeate conduit of the filtration unit.

In another example of aspect 1, the fluid for being introduced into the permeate section of the membrane unit passes through the fluid inlet of the sealing insert and out of the passage fluid outlet of the passage of the sealing insert.

In another example of aspect 1, the membrane unit further includes a support frame, and the sealing insert being arranged in the support frame. The frame further provides structural support for the membrane sheets, for example, along the perimeter portion of the membrane sheets such that the sheets have a rigid profile as mounted in the filtration unit.

In another example of aspect 1, the permeate inlet to the permeate section is arranged in the support frame.

In another example of aspect 1, the membrane unit further includes a membrane sheet attached (e.g., glued) to the support frame.

In a second aspect, there is disclosed a filtration unit that includes a membrane unit having a support frame partially defining a permeate chamber (e.g., outer perimeter of the chamber) of the membrane unit; and a sealing insert arranged in the support frame of the membrane unit, the sealing insert having a circumferential fluid channel on an outer perimeter surface of the sealing unit, wherein the fluid channel or a portion thereof on the outer perimeter surface of the sealing insert is open to the permeate chamber of the membrane unit. Being open to the permeate chamber means that the fluid channel is in fluid communication with the permeate chamber and supplies fluid (e.g., wastewater) to the chamber, for example, through an inlet to the chamber.

In an example of aspect 2, the fluid channel on the outer perimeter surface of the sealing insert extends around the entire circumference of the sealing insert. The width and depth of the fluid channel can be constant along the outer perimeter surface of the sealing insert to provide a uniform channel for fluid flow.

In another example of aspect 2, the sealing insert includes an internal passage with a passage inlet and a passage outlet, the passage outlet being open to the fluid channel on the outer perimeter surface of the sealing insert.

In another example of aspect 2, the outer perimeter surface of the sealing insert is circular and the fluid channel is a groove.

In another example of aspect 2, the sealing insert further includes an inner surface defining a fluid inlet to the sealing insert, the fluid inlet of the sealing insert connected to a passage inlet of a passage, the passage being in fluid communication with the fluid channel on the outer perimeter surface of the sealing insert.

In another example of aspect 2, the sealing insert is a ring structure, the fluid inlet of the sealing insert being a center opening in the ring structure and the passage extending radial outward from the center opening to the outer perimeter surface of the sealing insert.

In a third aspect, there is disclosed a filtration unit that includes a membrane unit that includes a permeate chamber, the permeate chamber having an chamber inlet; and a sealing insert in fluid communication with the chamber inlet of the permeate chamber of the membrane unit, the sealing insert being a ring structure comprising a fluid inlet defined by an inner circular surface, a fluid outlet, and an outer circular perimeter surface, the outer circular perimeter surface comprising a fluid channel extending around the entire outer circular perimeter surface, wherein the fluid channel on the outer perimeter surface of the sealing insert is open to the permeate chamber of the membrane unit.

In an example of aspect 3, the fluid channel on the outer circular perimeter surface of the sealing insert is a concave channel.

In another example of aspect 3, the sealing insert further includes a passage that extends from the fluid inlet defined by the inner circular surface to the fluid channel on the outer circular perimeter surface.

In another example of aspect 3, the passage is one passage of a plurality of passages that each extends from the fluid inlet defined by the inner circular surface to the fluid channel on the outer circular perimeter surface of the sealing insert.

In another example of aspect 3, the sealing insert is arranged in a support frame, the support frame having a surface that defines a portion of the permeate chamber.

In another example of aspects 1, 2 or 3, the sealing insert includes an elastomer and/or flexible material.

In a fourth aspect, there is disclosed a filtration unit that includes a membrane unit with a membrane filter sheet that has a first surface and an aeration guide system that contains a plurality of aeration guides. The aeration guides, for example channels or grooves formed in a component of a filter assembly (e.g., a spacer), function to direct a gas to multiple locations along the surface of a membrane sheet, such as the top or bottom area, to scour the surface and clean the membrane sheet from fouling. The aeration guide can be positioned against or near a surface of the membrane filter sheet in need of cleaning such that gas is delivered along the surface of the membrane sheet and contacts the surface to dislodge debris or other fouling from the surface of the membrane sheet.

In an example of aspect 4, each of the aeration guides of the plurality of aeration guides includes an inlet in fluid communication with a gas source and an outlet adjacent the first surface of the membrane sheet. The outlet can face perpendicular to, be angled or parallel with the membrane surface.

In another example of aspect 4, the gas source is an air scouring source for providing scouring air or gas to the first surface of the membrane sheet such that the scouring air flows through the plurality of aeration guides and onto a portion of the membrane sheet.

In another example of aspect 4, the aeration guides are arranged on a first surface of a spacer block secured to the membrane unit.

In another example of aspect 4, the spacer block includes an aeration opening in fluid connection with a gas source, and the aeration guides are connected to and in fluid communication with the aeration opening in the spacer block.

In another example of aspect 4, the plurality of aeration guides includes at least two primary aeration guides connected to the aeration opening and one or more secondary aeration guides that extend directly from each of the at least two initial aeration guides.

In another example of aspect 4, the secondary aeration guides include an outlet adjacent the first surface of the membrane sheet.

In another example of aspect 4, the outlet of the secondary aeration guides terminates on an external surface of the spacer block, for example, a perimeter surface.

In another example of aspect 4, the filtration unit includes a plurality of membrane units that are secured together with a spacer block between each membrane unit in the plurality of membrane units.

In another example of aspect 4, each spacer block in the plurality of membrane units contains an aeration guide system.

In a fifth aspect, there is disclosed a membrane sheet scouring unit that includes an aeration guide system positioned adjacent a first surface of the membrane sheet, the aeration guide system comprising a plurality of aeration guides for directing a scouring gas to multiple locations on the first surface of the membrane sheet.

In an example of aspect 5, each of the aeration guides of the plurality of aeration guides includes an inlet in fluid communication with a scouring gas source and an outlet adjacent the first surface of the membrane sheet.

In another example of aspect 5, the plurality of aeration guides includes at least two primary aeration guides and one or more secondary aeration guides that extend from each of the at least two initial aeration guides.

In another example of aspect 5, the at least two primary aeration guides are channels formed in a spacer block, and the at least two primary aeration guides include an inlet in fluid communication with a aeration opening in the spacer block.

In another example of aspect 5, the aeration guide system is a matrix of channels formed on a surface of a component of a filter assembly, the matrix of channels includes two or more outlets positioned against a surface of the membrane sheet for delivering scouring gas.

In another example of aspect 5, the component is a spacer block secured against a membrane unit that includes the membrane sheet.

Any one of the above aspects (or examples of those aspects) may be provided alone or in combination with any one or more of the examples of that aspect discussed above; e.g., the first aspect may be provided alone or in combination with any one or more of the examples of the first aspect discussed above; and the second aspect may be provided alone or in combination with any one or more of the examples of the second aspect discussed above; and so-forth.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments. Directional terms as used herein—for example, up, down, right, left, front, back, top, bottom—are made only with reference to the figures as drawn and are not intended to imply absolute orientation.

DETAILED DESCRIPTION

Figure 1:
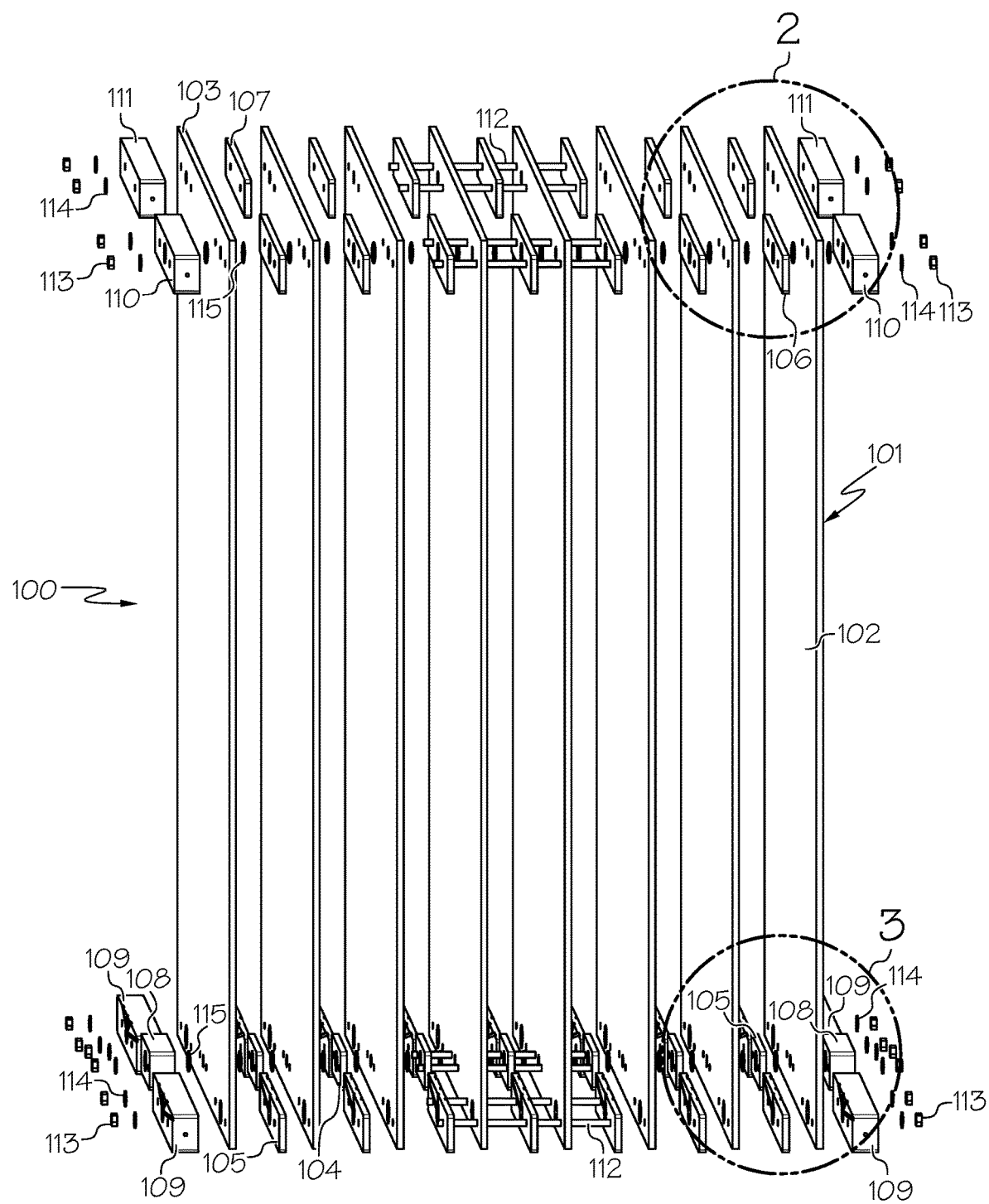
FIG. 1 shows an exploded perspective view of a filtration unit with membrane units secured together by spacer blocks.

Reference will now be made in detail to embodiments, examples of which are illustrated in the accompanying drawings. Whenever possible, the same reference numerals will be used throughout the drawings to refer to the same or like parts. Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal.

The present disclosure is directed to filtration units for treating fluids and the components within the filtration units that improve performance. A filtration unit can have a membrane system that removes suspended solids or microorganisms in a fluid, for example, in wastewater. As used herein, wastewater generally refers to a water-containing liquid that can be treated via filtration and optionally additional treatment operations to improve the water quality. The membrane system can include one or a plurality of membrane units, for example, in the form of filter cassette assemblies. Each membrane unit can include any suitable filtration means, for example, two parallel membrane sheets for filtering fluid (e.g., wastewater). The membrane units can also include a support frame with the open area inside the frame enclosed on both sides by the membrane sheets to create a permeate section (e.g., chamber) defined between the two framed membrane sheets and inner surface of the frame and/or components arranged in the frame (e.g., sealing insert).

The membrane units can be stacked or arranged together to provide increased fluid flow through a filtration unit. A series of spacers can connect the membrane units to one another while at the same time creating spaced flow channels therebetween. Any number of spacers can be used. The membrane sheets, support plates or frames, and spacers can have openings (e.g., holes) that align or are in register with one another such that a fastener can be received by all the holes of a particular alignment in order to secure the membrane units to one another. In addition to being arranged between each membrane unit, spacers can also be used on the outermost membrane units such that a fastener is tightened to these outermost spacers rather than the outermost membrane units themselves.

The membrane sheets, support plates, and spacers can also have openings or channels that align together to form one or more conduits passing through, such as a permeate conduit, an air bleed conduit, or an aeration conduit. Thus, these elements can have permeate openings or holes that align to form the permeate conduit, air bleed openings or holes that align to form an air bleed conduit, and aeration openings or holes that align to form an aeration conduit. The permeate conduit can be in direct fluid communication with the permeate sections of the membrane units for receiving permeate therefrom via the permeate inlet (e.g., permeate channel, hole or opening) in the support frames. For example, filter fluid can flow into a filter unit and be guided through a permeate conduit that is defined, at least partially, by permeate openings in support frames and spacer blocks, to deliver the filter fluid (i.e. permeate) to the inlets and into the permeate sections of the membrane units. To ensure that filter fluid passes into the permeate section, sealing inserts are positioned in the permeate openings or holes (i.e. permeate section inlet) of the support frames for facilitating the fluid connection or pathway between the permeate conduit or components thereof and the permeate sections of the membrane units.

The sealing inserts can fit tightly in the permeate openings of the membrane units to form a sealed inlet such that filter fluid does not leak out of the permeate conduit. The sealing inserts can have a fluid inlet (e.g., a center aperture or hole) that aligns with the permeate openings or holes of the membrane sheets and spacer blocks when assembled to form the permeate conduit. The sealing inserts also can have one or more passages (e.g., through holes) that extend from a first end (e.g., a first opening) at the fluid inlet (e.g., center hole) to a second end at a perimeter surface of the sealing insert for fluidly connecting the fluid inlet of the sealing insert to the permeate sections of the membrane units. The second ends or fluid outlets of the passages are in fluid communication with one another by a fluid channel (e.g., a groove, rectangular, triangular or square cross-section, concave duct, trough, or indentation) that extends from one fluid outlet to another fluid outlet of a passage or, for example, around the entire perimeter of the sealing inserts. The fluid channel (e.g., a circumferential indentation) on the perimeter of the sealing insert can have any suitable cross-section shape, for example, a semi-circle, rectangle or square, which can be uniform or vary along the entire length of the fluid channel.

The air bleed conduit can also be in direct fluid communication with the permeate sections of the membrane units through the permeate holes or openings in the support frames and various components to guide gas that accumulates in the permeate sections to be discharged or bled off through the conduit and out of the filtration unit. The same or similar type of sealing insert that can be used in the permeate fluid inlets of the membrane units (e.g., permeate fluid inlet of the support frames) can be positioned in the air bleed holes or openings of the support frames for facilitating the fluid connection between the air bleed conduit or components thereof and the permeate sections of the membrane units. It is to be appreciated that the aeration conduit need not be in direct connection with the permeate sections of the membranes as its purpose is to provide a scour gas to a surface (e.g., an outside surface) of the membrane sheets to prevent the fouling thereof. Because the aeration conduit may not be in direct communication with the permeate sections of the membrane unit, the aeration conduit optionally does not pass through the membrane units. The spacers having the aeration conduit have guides that receive the scouring gas from the aeration conduit in order to guide the gas to various points along the width of the membrane sheets so that the gas can scour the membrane surface across the whole width.

Filtered fluid (e.g., wastewater) can be drawn into a permeate section of the membrane units through the permeate conduit or components thereof by a permeate pump. As discussed above, each permeate section can be in fluid communication with a permeate conduit created by at least one set of spacers that connects the membrane units to one another. Mesh structures (e.g., mesh sheets, an open lattice structure) can be inserted into the permeate sections of the membrane units for preventing the membrane sheets from deforming or collapsing during the operation of the filtration unit, for example, as the permeate pump draws filter fluid into the permeate sections. The permeate conduit can be connected to the permeate pump by a permeate tube such that when the permeate pump is operated, the permeate conduit delivers permeate to the pump through the permeate tube. The permeate can then be pumped to any desired location, such as a storage tank or another unit operation. Intermediately, the permeate can be pumped through a permeate standpipe, which can be connected to a permeate outlet tube for discharge of filtered fluid.

In another embodiment, the inlet of the permeate pump can be fluid communication with a cleaning solution reservoir. The reservoir can be any suitable shape depending on the volume of cleaning solution to be stored. In one embodiment, the amount of cleaning solution can be suitable for one cleaning of the filtration unit and membranes. The reservoir can be an open container for providing easy access for a user to fill the reservoir with the desired cleaning solution. Alternatively, the container can have a closure or lid that can be opened to access the internal compartment of the reservoir, e.g., for filling with solution or maintenance. Preferably the reservoir is positioned at a location easily accessible to a user, for example at the top of the filtration unit or extending out of the housing for a filtration unit accessible to an operator or maintenance.

The reservoir can be in fluid connection (e.g., piping) with the inlet of the permeate pump. As the permeate pump is already connected to and in fluid communication with the filter unit for drawing or forcing permeate through the membrane units, the reservoir can be connected to a multi-connection valve (e.g., a three-way valve) or distribution system for directing cleaning solution flowing from the reservoir to the permeate pump. During normal operation of the filtration unit, the cleaning solution can be blocked from flowing to the permeate pump, for instance, by closing the valve in the piping from the reservoir outlet to the permeate pump. To clean the membrane units, the cleaning solution can be drawn into the permeate pump and flushed through the membrane units without the need for removing the filtration unit from a reservoir.

During operation of the filtration unit, filter fluid (e.g., wastewater) is drawn through the membrane sheets from the feed side of the permeate section to the permeate side, leaving behind debris, for example, particles larger than the pore size of the membrane sheets in the permeate section. Over time, this debris can accumulate on the feed side of the membrane sheets, resulting in fouling or blockage. The permeate chamber can have an air scour on the feed side of the membrane sheets that assists in preventing membrane fouling. The air scour can be provided by an aeration conduit in fluid communication with a gas source, preferably air, for feeding to the permeate section and across the feed side of the membrane sheets. The aeration conduit delivers gas near the bottom of the membrane sheet surfaces so that the gas proceeds upwards through or across the membrane sheets, scouring the surface of the membranes with gas which dislodges and forcibly removes debris and scale and prevents fouling on the membranes while at the same time creating a flow gradient through the membrane unit from the bottom air feed area towards the top of the membrane. The aeration conduit can deliver air to one or more sets of spacers that connect the membrane units to one another. Each spacer can have one or more guides that direct air in various directions along the width of the membranes to ensure that fouling is prevented along the entire width of the membranes.

Shown in the figures is a filtration unit 100 having a membrane system that includes membrane units 101 (eight are shown in FIG. 1). Each membrane unit 101 can include two membrane sheets 102 attached to a support frame or plate 103 that provides an perimeter mounting surface for one or more membrane sheets. In between each set of adjacent membrane units 101 are inside spacer blocks ("spacers"). On the outside of the outermost membrane units are outside spacer blocks ("blocks"). As shown in FIG. 1, there are lower middle spacers 104, lower outer spacers 105, and upper spacers 106 and 107, which are numbered separately. On the outermost membrane units 101 are lower middle blocks 108, lower outer blocks 109, and upper blocks 110 and 111. Each set of blocks 108-111 is aligned with corresponding spacers 104-107 to form fluid pathways through the plurality of membrane units 101 stacked together. Rods 112 (e.g., threaded rods) can be used to connect all of the spacers 104-107 and blocks 108-111 of the same alignment together to connect the membrane units 101 together in a stacked arrangement. End fasteners (e.g., nuts) 113 and washers 114 can be used to secure the rods 112 tightly for connecting the membrane units 101.

Figure 2:
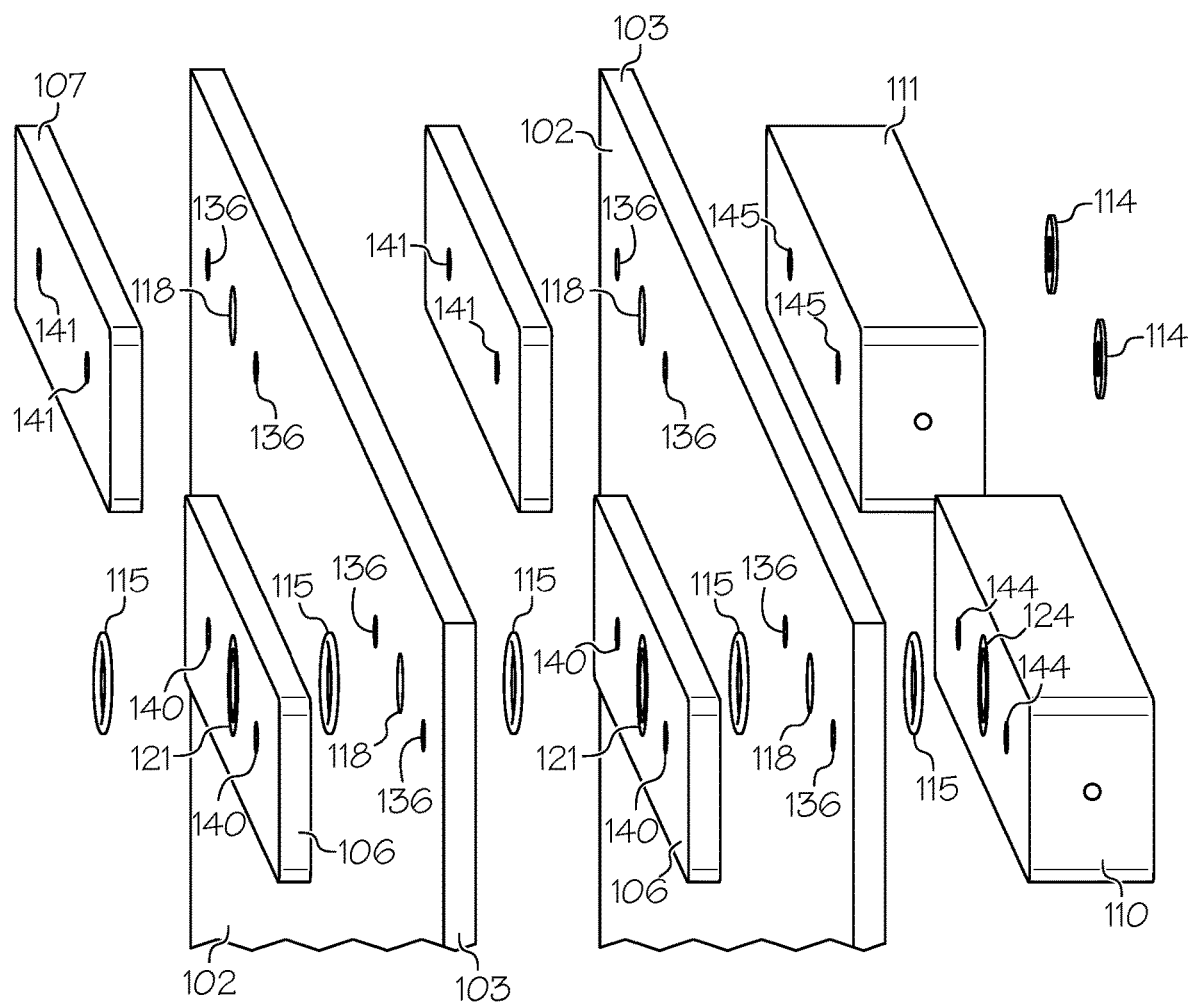
FIG. 2 shows an enlarged exploded perspective view of an upper section of the filtration unit of FIG. 1.
Figure 3:
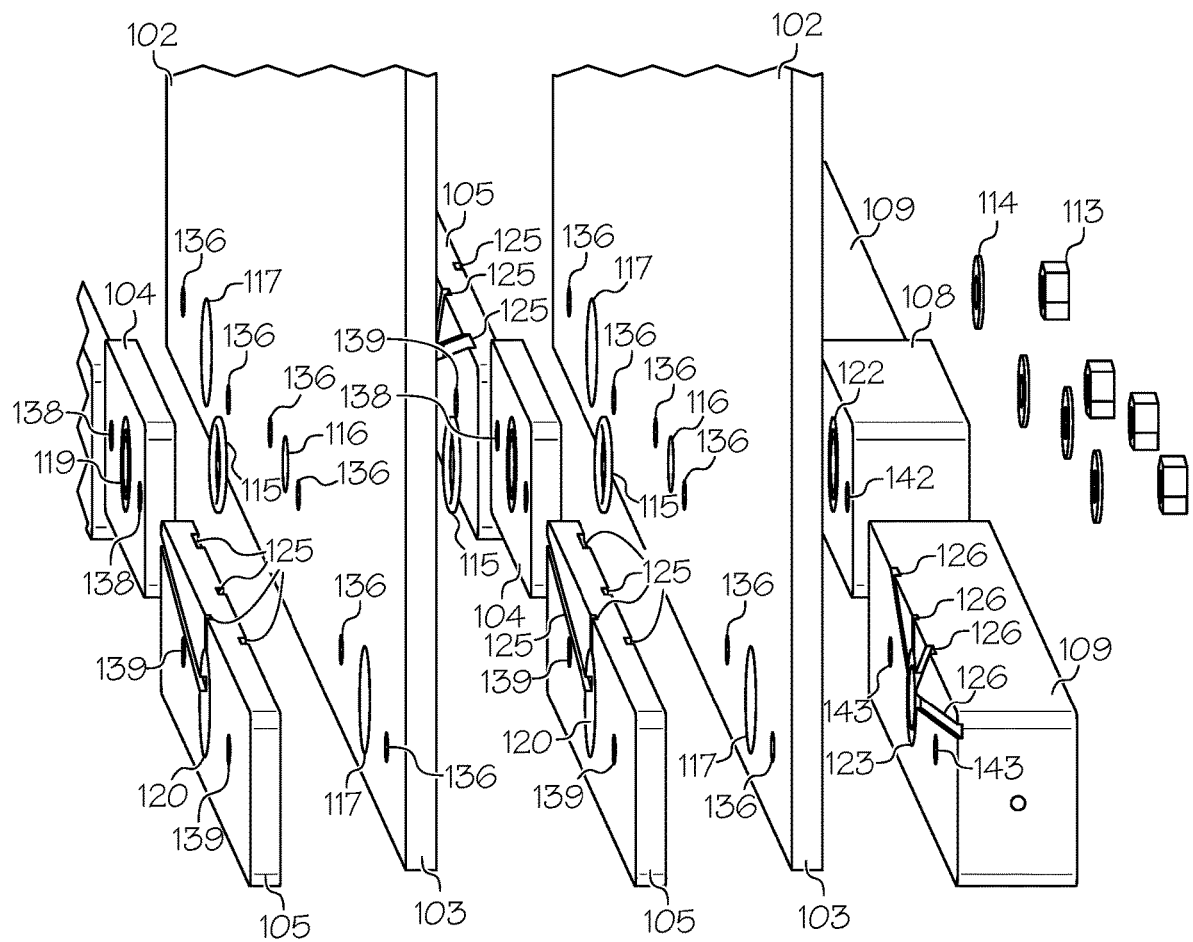
FIG. 3 shows an enlarged exploded perspective view of a lower section of the filtration unit of FIG. 1.

As shown in FIGS. 2 and 3, the membrane sheets 102 have permeate holes 116, aeration holes 117, and air bleed holes 118. While only one air bleed hole 118 for each membrane sheet 102 is utilized, having two air bleed holes 118 allows the same membrane sheet 102 to be used on either side of a support frame 103. The outside surfaces of the membrane sheets 102 can be sealed with o-rings 115 around the permeate holes 116 and air bleed holes 118. The spacers and blocks likewise have holes that align with those of the membrane sheets 102 when the membrane units 101 are assembled. The lower middle spacers 104 have permeate holes 119, the lower outer spacers 105 have aeration holes 120, and upper spacers 106 have air bleed holes 121, while upper spacers 107 do not. Similarly, the lower middle blocks 108 have permeate holes 122, the lower outer blocks 109 have aeration holes 123, and the upper blocks 110 have air bleed holes 124, while upper blocks 111 do not. The lower outer spacers 105 also have aeration guides 125 connected to the aeration holes 120 and the lower outer blocks 109 have aeration guides 126 connected to the aeration holes 123. These aeration guides 125 and 126 serve to guide gas to the surfaces of the membrane sheets 102 in order to scour the membrane surfaces.

Figure 4:
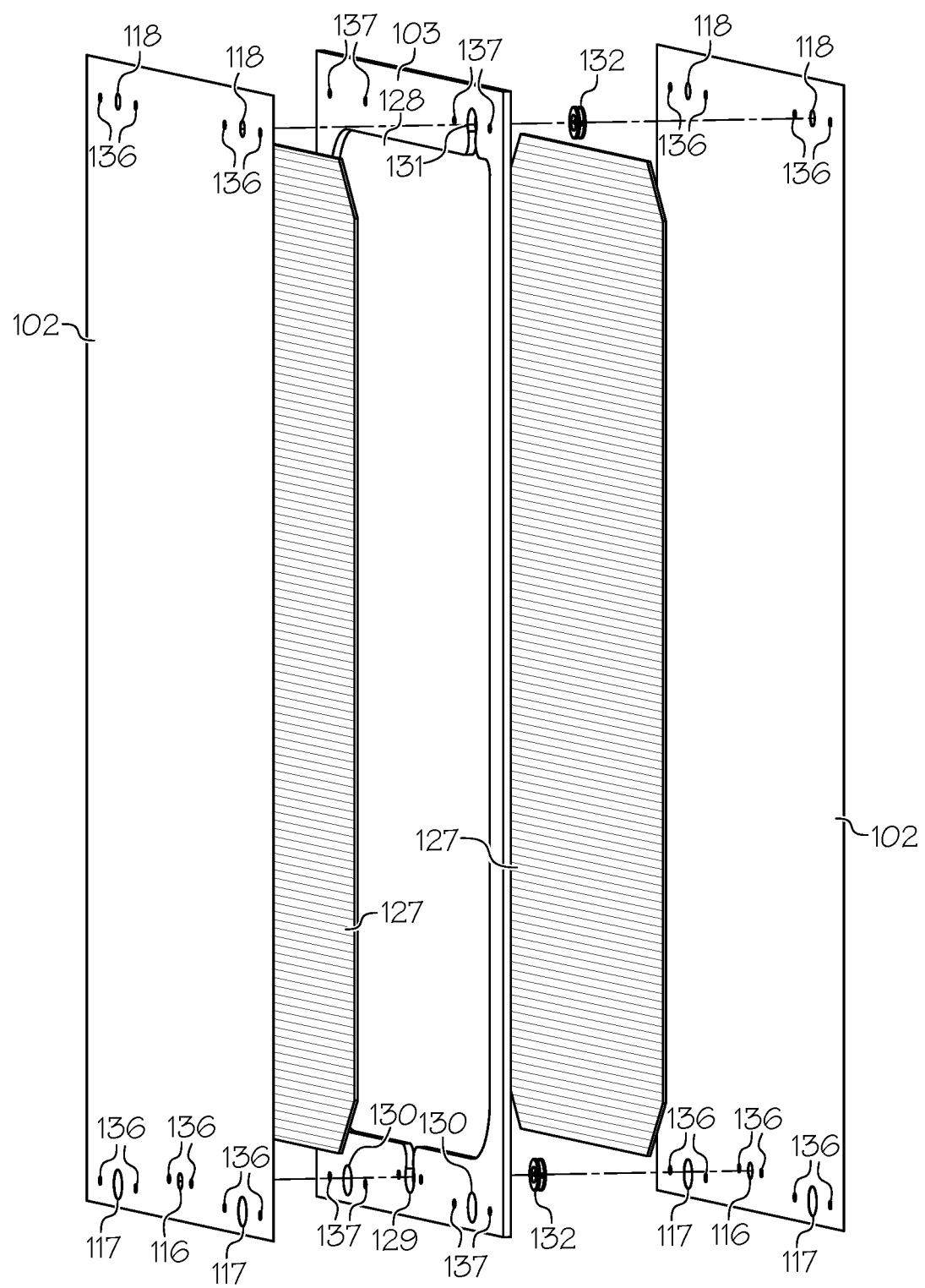
FIG. 4 shows an exploded perspective view of a membrane unit of the filtration unit of FIG. 1.

FIG. 4 also shows the membrane sheets 102 being affixed to the support frame 103, mesh sheets 127 are placed in the open area 128 of the support frames (i.e. the permeate section area) to ensure or prevent the membrane sheets 102 from deforming or collapsing into the open area 128 during operation. When the membrane sheets 102 are affixed to the support frames 103, this open area 128 defines a permeate section 128 of the membrane unit 101. The support frames 103 can have a permeate inlet (e.g., channel) 129 that aligns with permeate holes 116 of the membrane sheets 102, the permeate holes 119 of the lower middle spacers 104, and permeate holes 122 of the lower middle blocks 108. As shown, the permeate inlet 129 can be an open U-shaped channel formed in the support frame 103, for example, along the bottom inner surface. The rounded bottom portion of the U-shaped channel is aligned or in register with the permeate openings or holes 116 in the membrane sheets 102 to permit fluid flowing through the permeate holes 116 into the permeate section of the membrane unit. Similarly, the air bleed inlet 131 can have an open U-shaped channel formed in the support frame along the top inner surface, which can also house a sealing insert.

As shown in FIGS. 1-4, the support frames 103 also have aeration holes 130 that align with the aeration holes 117 of the membrane sheets 102, aeration holes 120 of the lower outer spacers 105, and aeration holes 123 of the lower outer blocks 109. The support frames 103 further have an air bleed channel 131 that aligns with one of the two air bleed holes 118 of the membrane sheets 102, the air bleed holes 121 of the upper spacers 106, and air bleed holes 124 of the upper blocks 110. The permeate inlet (e.g., channel) 129 and the air bleed inlet or channel 131 are also connected to the permeate section 128, connecting the permeate section 128 to permeate holes 116, 119, and 122 and to air bleed holes 118, 121, and 124.

When the membrane units 101 are assembled, sealing inserts 132 can be positioned or inserted into the permeate inlets 129 and/or the air bleed inlets or channels 131. For example, a round sealing insert can be positioned in the permeate inlet or air bleed channel to seal the fluid pathway into or from the permeate section with the corresponding permeate conduit or air bleed conduit. The sealing insert can be made of a flexible material, for example, rubber, elastomer, etc. that tightly fits and presses against the support frame of the membrane unit to ensure that fluid entering the unit does not leak out and operation pressure is maintained to provide expected performance of the filtration unit during operation.

Figure 5:
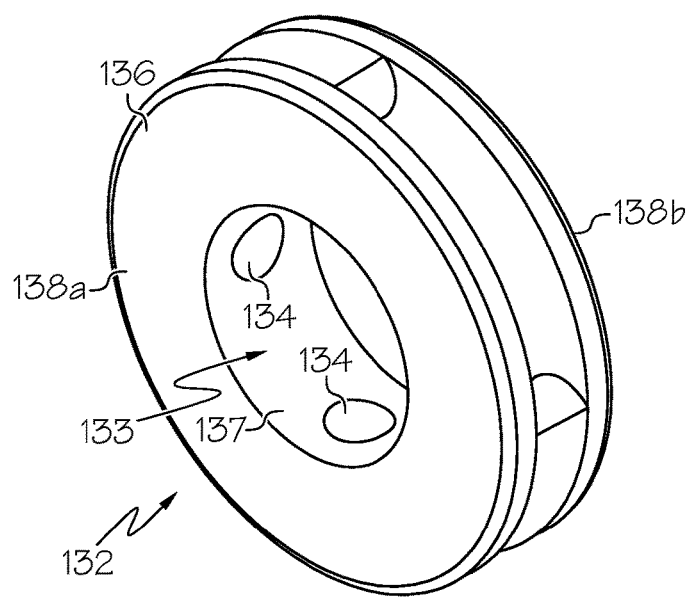
FIG. 5 shows a perspective view of a sealing insert.
Figure 6:
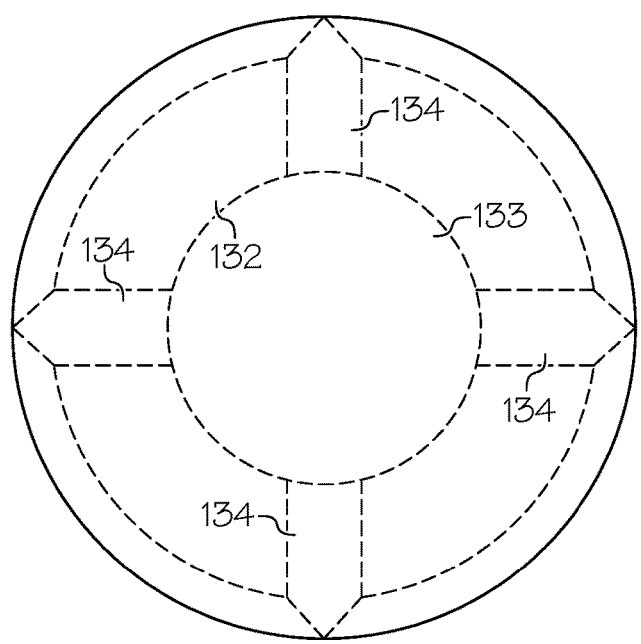
FIG. 6 shows a cross-section view of a sealing insert of FIG. 5.
Figure 7:
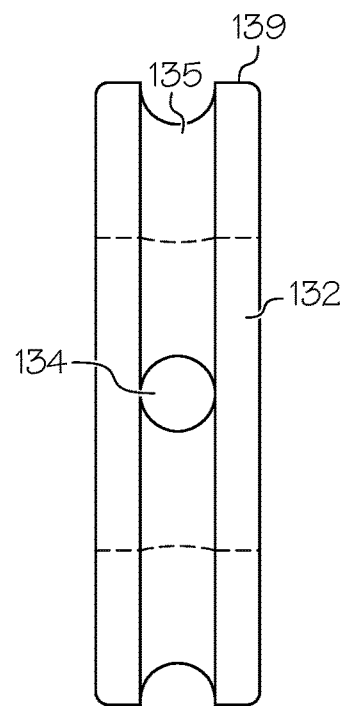
FIG. 7 shows a side view of a sealing insert of FIG. 5.

As seen in FIGS. 5-7, in one or more embodiments, the sealing inserts 132 can be round with a ring structure 136 have a desired depth for filling the channel in the support frame. At the center of the ring structure, center opening or hole 133 defines a fluid inlet for the sealing insert to receive fluid, for example, wastewater from the permeate conduit. The center opening 133 is formed by an inner circumferential surface 137 of the ring structure 136. As shown, the inner surface 137 can be a substantially planar surface having a circumferential shape that defines the open center throughway of the insert. The ring structure 136 further has a first face surface 138a and a second face surface 138b, both in the shape of a flat ring, that are arranged perpendicular to the longitudinal central axis of the sealing insert. The first face surface 138a and the second face surface 138b can be in contact with spacers and blocks, or a portion thereof, to form a tight fit or seal between the spacers and blocks and the support frames. The first face surface 138a and the second face surface 138b can also be in contact with an o-ring seal 115 positioned between the sealing insert 132 and one or more spacers or blocks.

Figure 8:
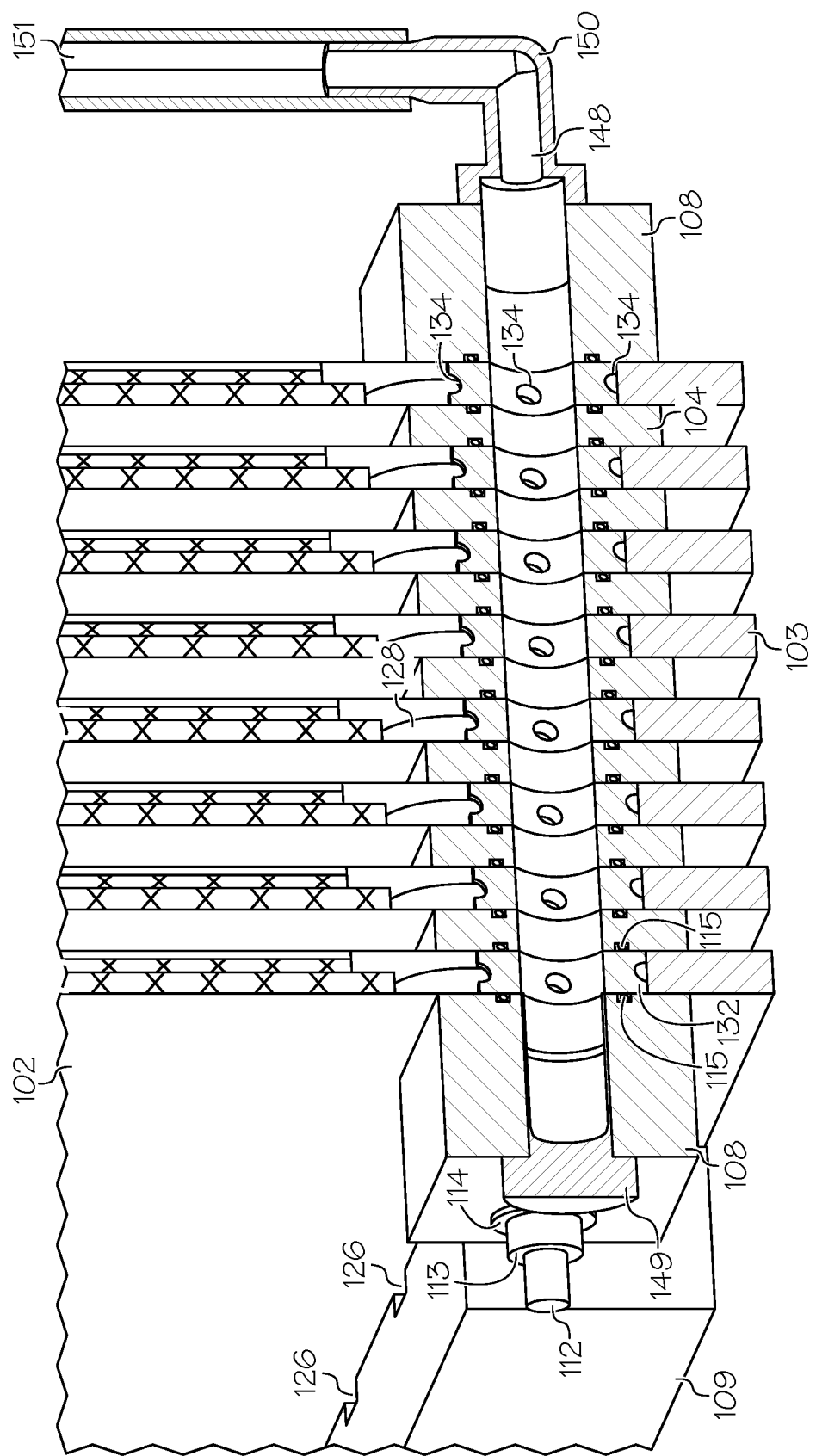
FIG. 8 shows a cross-section perspective view of a portion of the filtration unit of FIG. 1.

When the sealing inserts 132 are inserted into the permeate openings 129 and air bleed openings 131, the fluid inlet center holes 133 align with the permeate holes 116, 119, and 122 (e.g., as seen in FIG. 8) and the air bleed holes 118, 121, and 124, respectively. To provide permeate or filter fluid to the permeate sections of the membrane units, the sealing inserts 132 have internal passages 134 that connect the fluid inlet (e.g., center holes 133) to the perimeter surface of the sealing inserts 132, which serves to connect the fluid inlet 133 to the permeate channels 129 and the air bleed channels 131 and thus the permeate sections 128. The one or more passages 134, for example a plurality of passages (2, 3, 4, 5 or more), are arranged internally in the ring structure 136 section of the sealing inserts. In one example, the passages 134 are equally spaced apart in a radial manner from one another in the ring structure 136, which is shown in FIG. 6. In another example, the passages can have a uniform diameter and cross-sectional shape along the entire length. As shown, each passage 134 has an inlet or opening facing the fluid inlet of the sealing insert, for example, on the inner surface 137 of the ring structure 136. The passage 134 has a fluid pathway that extends outward (e.g., radially) to an outlet opening on the outer perimeter surface 139. The passage 134 thereby directed filter fluid or permeate from the inlet of the sealing insert to its perimeter surface area, which is in fluid communication with the permeate section of the membrane unit.

FIGS. 5-7 also show that the sealing inserts 132 can have a fluid channel 135 on the perimeter surface 139 (e.g., the outer circumferential perimeter surface). FIG. 7 illustrates that, in one or more embodiments, the fluid channel can be a perimeter groove or concave indentation 135 extending around and along the entire perimeter surface of the sealing insert. As the outlets of the passages 134 end at the perimeter surface, each passage outlet can reside in the fluid channel 135, which can be centrally located on the perimeter surface 139 as shown. The fluid channel 135 preferably connects all of the outlets of the passages 134 together such that fluid entering the sealing insert 132 can flow through at least one passage 134 and out of the insert through a portion of the fluid channel 135.

The fluid channel (e.g., perimeter groove) 135 allows the sealing inserts 132 to be inserted into the permeate channels 129 and the air bleed channels 131 in any orientation and still allow the permeate sections 128 to be connected to the fluid inlet of the sealing inserts and thus the permeate holes 116, 119, and 122 and the air bleed holes 118, 121, and 124. Moreover, if the sealing inserts 132 were to move during operation, and one of the passages 134 were not aligned with the permeate inlet of the permeate section defined by the support frame, the perimeter fluid channel 135 prevents this movement from affecting the ability of permeate to flow into the permeate section of the membrane unit. That is, permeate fluid can flow from the center inlet of the insert and through the passageways to the fluid channel and then into the permeate section.

The fluid channel 135, by being inset from the outer perimeter surface 139 to form a cavity or void in plane of surface 139, creates a fluid duct for fluid flow when arranged in the permeate inlet (e.g., U-shaped channel) of the support frame for permitting filter fluid to flow around the perimeter surface of the sealing insert and exit into the permeate section of the membrane unit. For example, a portion of the outer perimeter surface 139 can be in direct contact with the support frame on one or both sides of the fluid channel, wherein the inner surface of the fluid channel is not in contact with the support frame. FIG. 7 further illustrates that the perimeter surface 139 can be a horizontal surface on each side of fluid channel 135 to form an outer perimeter rim around each edge of the fluid channel. The fluid channel 135 has an inner surface that is lower than the perimeter surface plane such that the inner surface, and the open channel it defines, is inset into the ring structure 136.

Turning back to FIGS. 1-4, as discussed above, in order to connect the membrane units 101 together, threaded rods 112, nuts 113, and washers 114 can be utilized. The membrane sheets 102 have rod holes 136 and the support frames 103 correspondingly have rod holes 137 for receiving the threaded rods 112. As shown in FIG. 1, each set of spacers and its corresponding blocks receive two threaded rods 112 to connect the membrane units 101 together, totaling ten threaded rods 112. Thus, the membrane sheets 102 have ten rod holes 136 and the support frames 103 correspondingly have ten rod holes 137. Further, the lower middle spacers 104 have two rod holes 138, the lower outer spacers 105 have two rod holes 139, the upper spacers 106 have two rod holes 140, and the upper spacers 107 have two rod holes 141.

Additionally, the lower middle blocks 108 have two rod holes 142, the lower outer blocks 109 have two rod holes 143, the upper blocks 110 have two rod holes 144, and the upper blocks 111 have two rod holes 145. As seen in FIGS. 3, 4 and 8, the lower middle spacers 104 have o-ring grooves 146 and the lower middle blocks 108 have o-ring grooves 147 that each receive o-rings 115 for sealing the membrane sheets 102 around the permeate holes 116. Similarly, while not depicted, the upper spacers 106 have o-ring grooves and the upper blocks 110 have o-ring grooves that each receives o-rings 115 for sealing the membrane sheets 102 around the air bleed holes 118.

As seen in FIG. 8, when the membrane units 101 are tightly secured together using threaded rods 112, a permeate conduit 148 is formed from the permeate holes 116, 119, and 122 as well as the fluid inlets (e.g., center holes) 133 of the sealing inserts 132 in the permeate inlets (e.g., channels) 129. The permeate conduit 148 is connected to the permeate sections 128 through the through openings 134 of the sealing inserts 132. The sealing inserts 132 have both first and second faces of the ring structure in direct contact with the o-rings 115 positioned in the blocks and spacers, as well as portions of the face surfaces of the blocks and spacers, to create a fluid tight seal to prevent fluid in the permeate conduit from leaking out.

At one end of the permeate conduit 148 in the lower middle block 108 is a permeate plug 149 which closes the conduit at this end. At the other end of the permeate conduit 148 in the lower middle block 108 is a permeate connector 150 which connects the conduit to a first section of permeate tube 151. Although not shown, the first section of permeate tube 151 can be connected to a permeate pump which is connected to a permeate standpipe via another section of permeate tube 151.

While not explicitly shown, it is to be appreciated that an air bleed conduit is formed in the same manner as the permeate conduit 148 from air bleed holes 118, 121, and 124 as well as the fluid inlets (e.g., center holes) 133 of the sealing inserts 132 in the air bleed openings (e.g., channels) 131. Furthermore, while also not explicitly shown, it is to be appreciated that aeration conduits are formed in a similar manner as the permeate conduit 148 and the air bleed conduit from aeration holes 117, 120, 123 and 130. Unlike the permeate conduit 148 and the air bleed conduit, the aeration conduits are not directly connected to the permeate sections 128 of the membrane units 101. The aeration conduits are connected to the aeration guides 125 and 126.

Aeration tubes can deliver gas to the aeration conduits via aeration connectors in lower outer blocks 109. The gas is then distributed to the aeration guides 125 and 126, which guide the air across the surface of each membrane sheet 102. As the gas rises from the guides 125 and 126, it scours the surfaces of the membrane sheets 102, dislodging any debris and preventing fouling on the sheets. The aeration tubes (not shown) can be connected to an aeration standpipe for receiving gas therefrom. An air bleed check valve allows gas that accumulates within the permeate sections 128 of the membrane units to be discharged or bled out. An air bleed check valve can be connected to a first end of the air bleed conduit with an air bleed connector. The other end of the air bleed conduit can be plugged with an air bleed plug.

A permeate pump can be used to create a vacuum effect in the membrane units where fluid is drawn into the permeate pump from a permeate tube or piping, which draws fluid from the permeate conduit 148, which draws fluid from the permeate sections 128, which draws fluid from the outside of the membrane sheets 102 into the permeate sections 128, thereby filtering the fluid. As the fluid is filtered through the membrane sheets 102, debris can accumulate on the membrane sheets 102, which can reduce the effectiveness thereof. To prevent the accumulation of this debris, gas is delivered to the aeration conduits, which delivers the gas to the aeration guides 125 and 126. The gas is then guided by the aeration guides 125 and 126 to various points along the width of the membrane sheets 102, where it then rises upwards across the surfaces of the sheets to provide a scour that dislodges and prevents the accumulation of debris in lower portions of the permeate sections and permeate conduits. As the gas is delivered to the fluid around the membrane units 101, some of the gas may become dissolved in the fluid and/or pass through the membrane sheets 102 into the permeate sections 128. The density of the gas will result in it proceeding to the air bleed conduit. Periodically, an air bleed valve can be opened to let accumulated gas bleed out of the membrane units 101.

Figure 9:
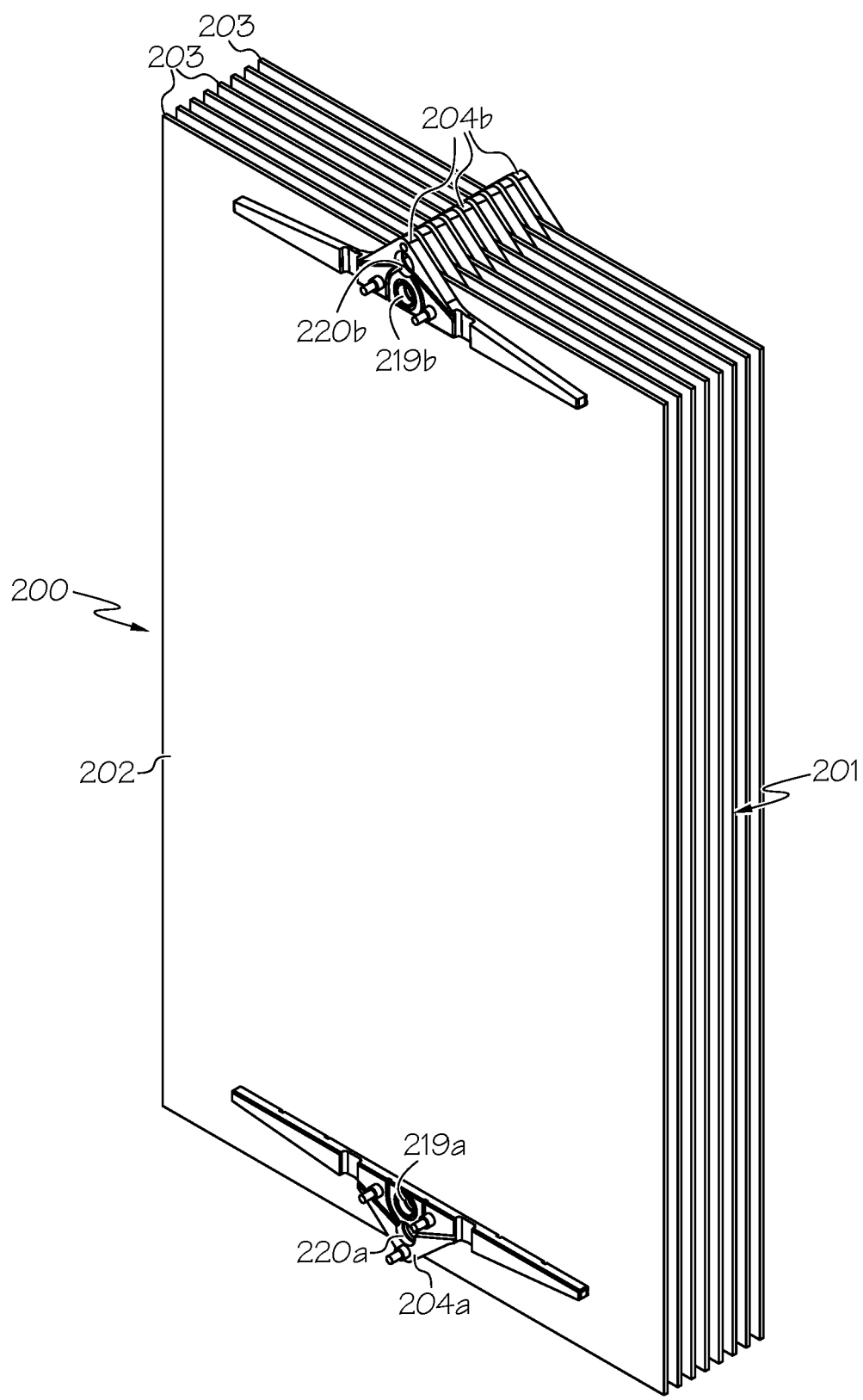
FIG. 9 shows a perspective view of a filtration unit with membrane units secured together by spacer blocks.
Figure 10:
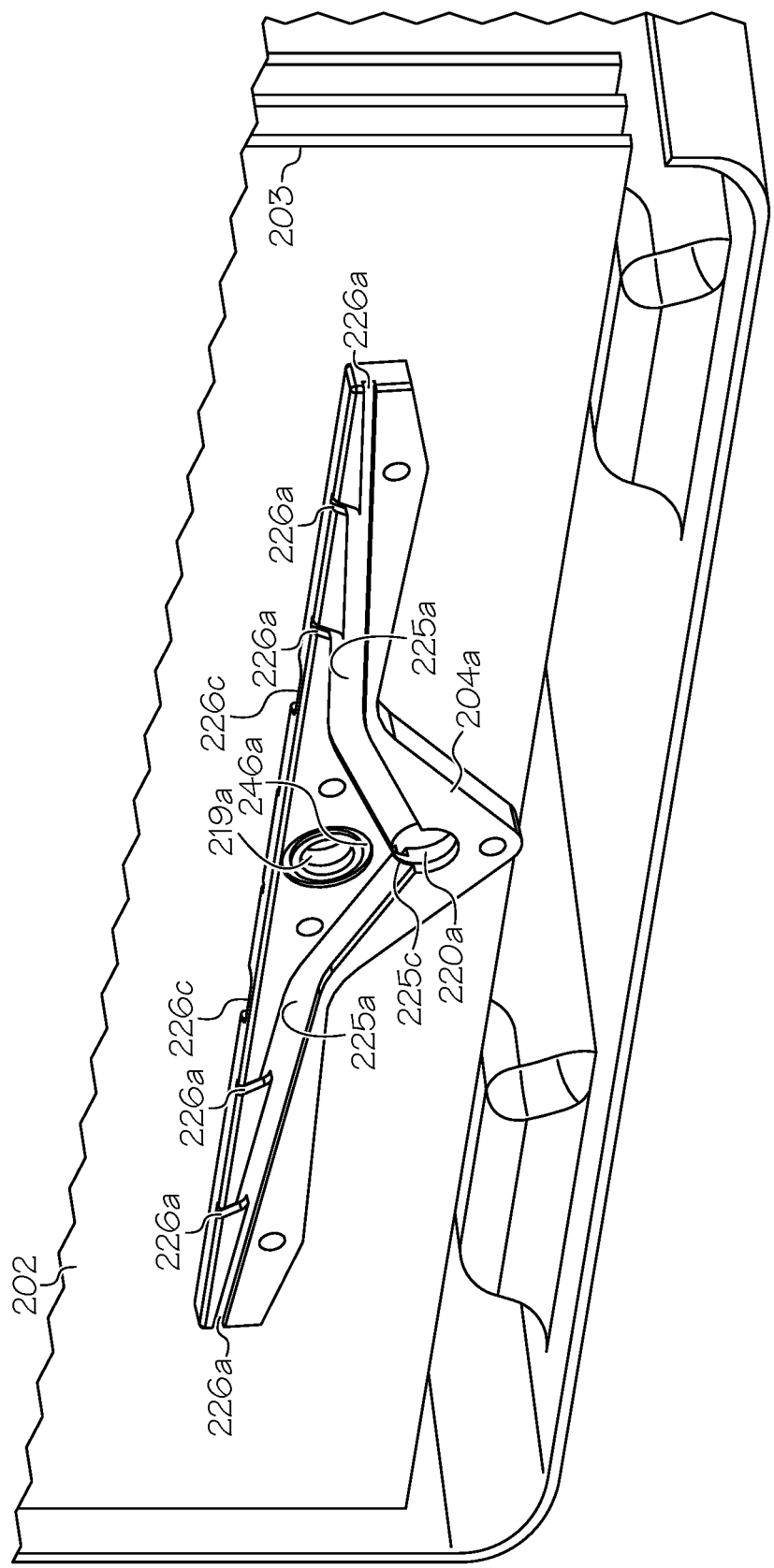
FIG. 10 shows an enlarged perspective view of a lower section spacer block with an aeration guide system of the filtration unit of FIG. 9.
Figure 11:
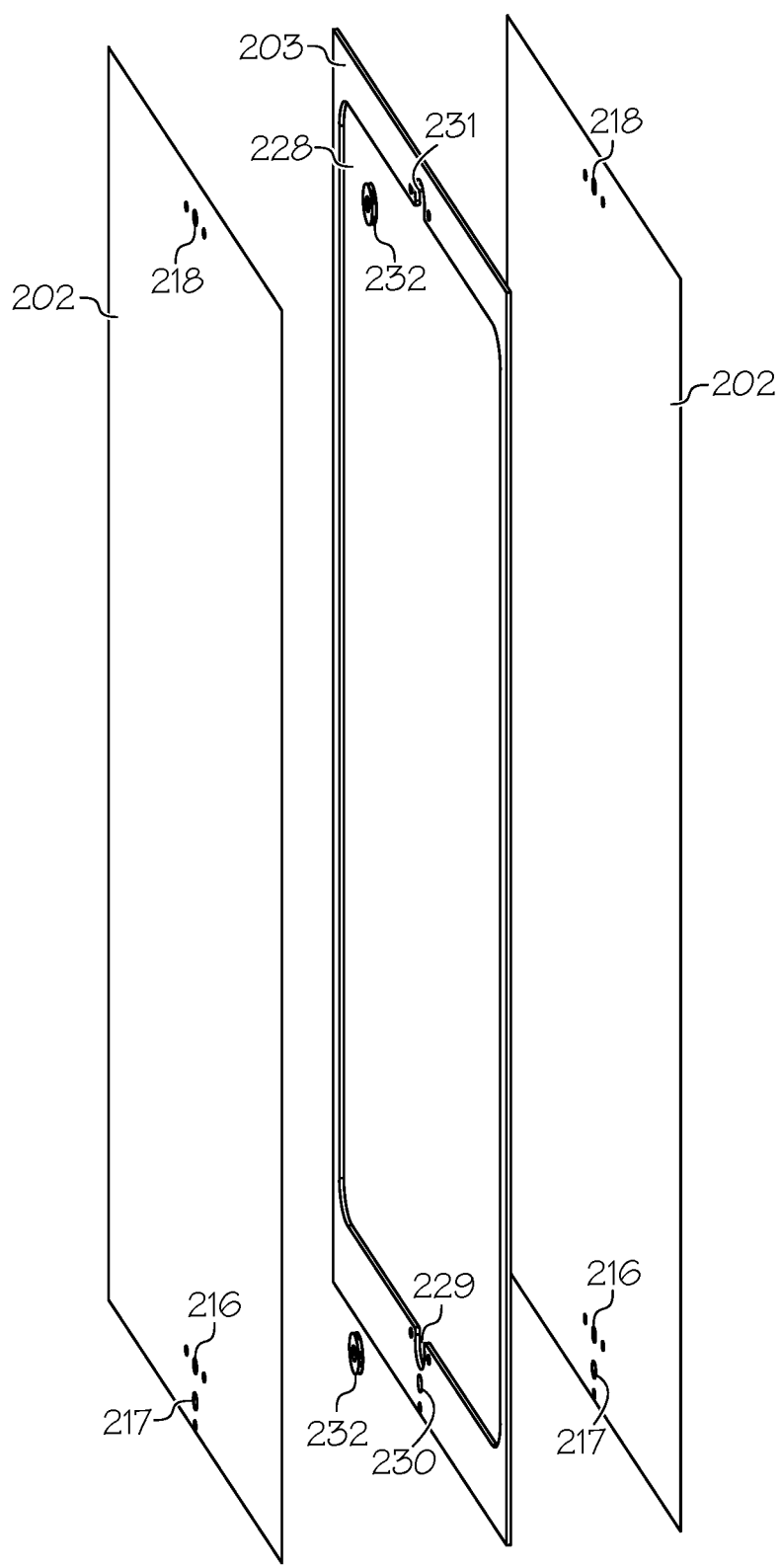
FIG. 11 shows an exploded perspective view of a membrane unit of FIG. 9.

Another example of a filtration unit 200 containing a membrane system containing membrane units 201 is shown in FIGS. 9-11. The membrane system includes membrane units 201 made up of membrane sheets 202 and support frames 203. The membrane system 200 shown utilizes a one-piece spacer 204 design for both lower spacers 204a and upper spacers 204b in between the membrane units 201. The spacers 204 also serve as lower blocks 204a on the ends of the outermost membrane units 201 aligned with the lower spacers 204a. Similarly, spacers 204 also serve as upper blocks 204b on the ends of the outermost membrane units 201 aligned with the upper spacers 204b. The spacers have two sets of holes 219 and 220. In the lower spacers and lower blocks 204a, holes 219 serve as permeate holes 219a and holes 220 serve as aeration holes 220b. In the upper spacers and upper blocks 204b, holes 219 serve as air bleed holes 219b and holes 220b are not utilized. Like the membrane sheets 102 having two upper holes 118, holes 220b are present for the ease of manufacture in that they allow the same spacers 204 to be utilized on both ends of the membrane units 201.

Figure 12:
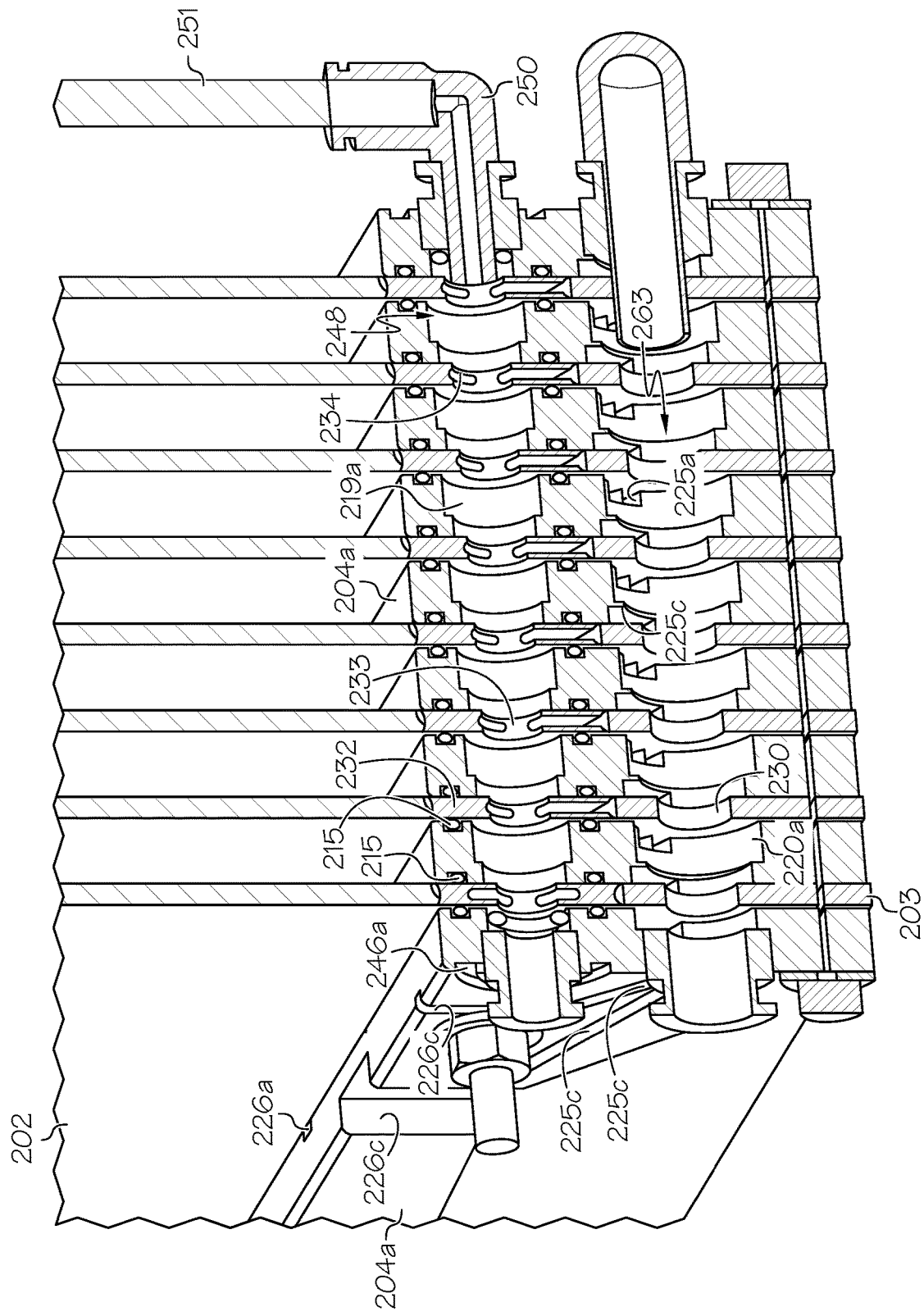
FIG. 12 shows a cross-section perspective view of a portion of the filtration unit of FIG. 9.

As shown in FIGS. 10, 11 and 12, in between each spacer 204 and each membrane unit 201 are o-rings 215 that seal the permeate holes 216 and the air bleed holes 218 of the membrane sheets 202. The membrane sheets also have aeration holes 217. The permeate holes 216 are connected to permeate sections 228 of the support frames 203 with permeate inlets (e.g., U-shaped channels) 229. The air bleed holes 218 are connected to permeate sections 228 of the support frames 203 with air bleed channels 231. Sealing inserts 232, which are the same as sealing inserts 132, are inserted into permeate inlets 229 and 231 such that their center holes align with permeate holes 216 and air bleed holes 218, respectively. The operation and fit of sealing inserts 232 in the support frames 203 can be the same or similar to that described above for sealing inserts 132 and support frames 103.

The support frames 203 also can have aeration holes 230 that align with the aeration holes 217. As shown, the spacers 204 (i.e. lower and upper) can have one or more aeration guides for directing gas (e.g., air scour gas) to travel along the surfaces of the membrane sheets. An aeration guide system like that shown in FIG. 10 can be formed on any suitable component of a filtration unit. Although shown only on a lower spacer, the aeration guide system can be on an upper spacer and on a plurality of spacers arranged in a filter assembly. In one embodiment, the aeration guide system is formed as a matrix of channels on a surface of one or more spacer blocks that are used to separate membrane units. The spacer blocks are positioned against a surface of the membrane unit such that gas traveling through the aeration guide system exits the system and contacts a surface of the membrane sheet to clean or scour the sheet surface to dislodge debris and reduce fouling for more efficient operation of the filtration unit.

The aeration guide system can include one or more primary aeration guides, each connected to one or more secondary aeration guides for delivering gas to the surface of the membrane sheet, for example the permeate or non-permeate surface. The secondary aeration guides can stem or branch off of the primary aeration guide along its length to form a distribution of aeration outlets for equally distributing gas over a surface of a membrane sheet. As shown, the one or more aeration guides can be in fluid connection with the aeration hole 220 in the spacer 204, which is further in fluid communication with the aeration holes in the support frames. Gas can flow from the aeration hole 220 in the spacer 204 and into the aeration guides before being directed to select areas at the base of the membrane sheets. For example, there can be two types of aeration guides 225 for guiding gas to various points along the surfaces of membrane sheets 202. As shown in FIGS. 10 and 12, the lower spacers 204a can have a first primary aeration guide 225a and a second primary aeration guide 225c. The first and second primary aeration guides can direct gas to a first and second side of the membrane sheets, respectively.

The spacers 204, either upper and/or lower spacers, can have one or more secondary aeration guides connected with the primary aeration guides to form a matrix of aeration channels in a component of the filter assembly for delivering gas to the surface of a membrane unit. The secondary aeration guides can have an inlet in fluid connection with the primary aeration guides and an outlet that terminates to feed gas to a surface of a membrane sheet, e.g., at an exterior surface of the spacer. For example, the lower spacers 204a also can have secondary aeration guides 226a for receiving gas from the primary aeration guides 225a and guiding them to various points along the width of the membrane sheets 202 such that the entire surface of the membrane sheets can be cleaned as opposed to only portions. The aeration guide system also ensures that the membrane sheets are cleaned evenly rather than portions receiving more or less scouring gas than other portions of a membrane sheet.

The primary aeration guides can function as a header for distributing gas through the aeration guide system and into the secondary aeration guides for delivering gas to multiple locations along the membrane sheet. In one or more embodiments, the primary aeration guides can extend along the length of the spacer to one or opposite ends. For example, the primary aeration guides can have a first end and a second end. The first end can be open to a gas feed source, such as an aeration opening in a spacer or component of a filter assembly. The second end of the primary aeration guide can terminate and be open to feed gas to a surface of a membrane sheet, for example, shown in FIG. 10 as aeration guide 226a, which is the outlet of primary guide 225a.

The lower spacers 204a also have o-ring grooves 246a for receiving o-rings 215. As can be seen in FIG. 12, the permeate holes 219a of the lower spacers and the center holes 233 of the sealing inserts 232 align to form permeate conduit 248, which is connected to permeate tube 251 via permeate connector 250. Similarly, aeration holes 220a of the lower spacers 204a and the aeration holes 230 of the support plates 203 align to form aeration conduit 263, which receives a scour gas that it delivers to the aeration primary aeration guides 225a and 225c.

Many variations and modifications may be made to the above-described embodiments of the disclosure without departing substantially from the spirit and various principles of the disclosure. All such modifications and variations are intended to be included herein within the scope of this disclosure and protected by the following claims.

What is claimed is:

1. A filtration unit comprising:
   a. a membrane unit comprising a membrane sheet, the membrane sheet having a first surface; and
   b. a spacer block comprising an aeration opening and an aeration guide system in fluid communication with the aeration opening, the aeration guide system comprising a plurality of aeration guides for directing gas to multiple locations on the first surface of the membrane sheet the plurality of aeration guides comprising a primary aeration guide and a secondary aeration guide extending from the primary aeration guide, wherein the aeration guide system is positioned against the membrane unit.

2. The filtration unit of claim 1, wherein the each of the aeration guides of the plurality of aeration guides comprises an inlet in fluid communication with the aeration opening and an outlet adjacent the first surface of the membrane sheet.

3. The filtration unit of claim 2, the aeration opening being in fluid communication with a gas source for providing a gas to the first surface of the membrane sheet such that the gas flows through the plurality of aeration guides.

4. The filtration unit of claim 1, wherein the plurality of aeration guides comprises a second primary aeration guides connected to the aeration opening and a second secondary aeration guides that extends from the second primary aeration guide.

5. The filtration unit of claim 4, wherein the secondary aeration guides comprise an outlet adjacent the first surface of the membrane sheet.

6. The filtration unit of claim 5, wherein the outlet of the secondary aeration guides terminates on an external surface of the spacer block.

7. The filtration unit of claim 1, wherein a plurality of membrane units are secured together with the spacer block between each membrane unit in the plurality of membrane units.

8. A membrane sheet scouring unit comprising an aeration guide system positioned adjacent a first surface of the membrane sheet, the aeration guide system comprising a plurality of aeration guides for directing a scouring gas to multiple locations on the first surface of the membrane sheet, the plurality of aeration guides comprising a primary aeration guide and a secondary aeration guide extending from the primary aeration guide, the secondary aeration guide comprising an outlet at the first surface of the membrane sheet.

9. The membrane sheet scouring unit of claim 8, wherein the each of the aeration guides of the plurality of aeration guides comprises an inlet in fluid communication with the scouring gas source and an outlet adjacent the first surface of the membrane sheet.

10. The membrane sheet scouring unit of claim 8, wherein the plurality of aeration guides comprises a second primary aeration guide and a second secondary aeration guides that extends from the second primary aeration guides.

11. The membrane sheet scouring unit of claim 8, wherein the plurality of aeration guides are channels formed in a spacer block, and the primary aeration guides comprises an inlet in fluid communication with an aeration opening in the spacer block.

12. The membrane sheet scouring unit of claim 8, the aeration guide system being a matrix of channels formed on a surface of a component of a filter assembly, the matrix of channels comprising two or more outlets positioned against a surface of the membrane sheet for delivering scouring gas.

13. The membrane sheet scouring unit of claim 12, wherein the component is a spacer block secured against a membrane unit comprising the membrane sheet.

14. A filtration unit comprising:
a. a membrane unit comprising a permeate inlet for introducing fluid into a permeate section of the membrane unit; and
b. a sealing insert comprising a fluid inlet, a passage radially extending from the fluid inlet and the passage having a passage fluid outlet, and an outer perimeter surface comprising a fluid channel extending around the entire outer perimeter surface of the sealing insert, the passage fluid outlet of the sealing insert and the fluid channel of the outer perimeter surface of the sealing insert being in fluid communication with the permeate inlet of the membrane unit.

15. The filtration unit of claim 14, wherein the fluid inlet of the sealing insert is a central opening of a ring structure and the passage is radially arranged in the ring structure.

16. The filtration unit of claim 14, wherein the outer perimeter surface of the sealing insert comprises the passage fluid outlet of the passage.

17. The filtration unit of claim 14, wherein the sealing insert comprises a plurality of passages each comprising a passage inlet open to the fluid inlet of the sealing insert and a passage outlet in fluid communication with the permeate inlet of the membrane unit.

18. The filtration unit of claim 14, wherein the fluid inlet of the sealing insert is connected to a permeate conduit of the filtration unit.

19. The filtration unit of claim 14, wherein the fluid for being introduced into the permeate section of the membrane unit passes through the fluid inlet of the sealing insert and out of the passage fluid outlet of the passage of the sealing insert.

20. The filtration unit of claim 14, wherein the membrane unit further comprises a support frame, and the sealing insert being arranged in the support frame.

21. The filtration unit of claim 20, wherein the permeate inlet to the permeate section is arranged in the support frame.

22. The filtration unit of claim 20, wherein the membrane unit further comprises a membrane sheet attached to the support frame.

23. A filtration unit comprising
a. a membrane unit comprising a permeate chamber, the permeate chamber comprising an chamber inlet; and
b. a sealing insert in fluid communication with the chamber inlet of the permeate chamber of the membrane unit, the sealing insert being a ring structure comprising a fluid inlet defined by an inner circular surface, a fluid outlet, and an outer circular perimeter surface, the outer circular perimeter surface comprising a fluid channel extending around the entire outer circular perimeter surface, wherein the fluid channel on the outer perimeter surface of the sealing insert is open to the permeate chamber of the membrane unit.

* * * * *

UNITED STATES PATENT AND TRADEMARK OFFICE
CERTIFICATE OF CORRECTION

PATENT NO. : 10,744,465 B2
APPLICATION NO. : 16/156403
DATED : August 18, 2020
INVENTOR(S) : Adam Arnold et al.

Page 1 of 1

It is certified that error appears in the above-identified patent and that said Letters Patent is hereby corrected as shown below:

In the Claims

Column 15, Line 15 Claim 4:
"primary aeration guides" should be "primary aeration guide"

Column 15, Line 17 Claim 4:
"aeration guides that" should be "aeration guide that"

Column 15, Line 46 Claim 10:
"aeration guides that" should be "aeration guide that"

Column 15, Line 47 Claim 10:
"primary aeration guides." should be "primary aeration guide."

Column 15, Line 50 Claim 11:
"aeration guides comprises" should be "aeration guide comprises"

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*